United States Patent
Buckley et al.

(10) Patent No.: US 12,225,444 B2
(45) Date of Patent: Feb. 11, 2025

(54) SUPPORT OF EMERGENCY NUMBER DESCRIPTIONS

(71) Applicant: Malikie Innovations Limited, Dublin (IE)

(72) Inventors: Adrian Buckley, Tracy, CA (US); Jan Hendrik Lucas Bakker, Fort Worth, TX (US)

(73) Assignee: Malikie Innovations Limited, Dublin (IE)

( * ) Notice: Subject to any disclaimer, the term of this patent is extended or adjusted under 35 U.S.C. 154(b) by 5 days.

(21) Appl. No.: 18/194,352

(22) Filed: Mar. 31, 2023

(65) Prior Publication Data
US 2023/0276217 A1  Aug. 31, 2023

Related U.S. Application Data

(63) Continuation of application No. 17/057,559, filed as application No. PCT/EP2019/063155 on May 21, 2019, now Pat. No. 11,689,910.

(60) Provisional application No. 62/674,464, filed on May 21, 2018.

(51) Int. Cl.
*H04W 4/90* (2018.01)
*H04W 60/00* (2009.01)

(52) U.S. Cl.
CPC .............. *H04W 4/90* (2018.02); *H04W 60/00* (2013.01)

(58) Field of Classification Search
CPC ................................. H04W 4/90; H04W 60/00
USPC ...................................................... 455/404.1
See application file for complete search history.

(56) References Cited

U.S. PATENT DOCUMENTS

| | | |
|---|---|---|
| 8,878,889 B1 | 11/2014 | Kaupp et al. |
| 2002/0138649 A1 | 9/2002 | Cartmell et al. |
| 2005/0009536 A1 | 1/2005 | Ito et al. |
| 2011/0188416 A1 | 8/2011 | Faccin et al. |
| 2012/0231795 A1 | 9/2012 | Witzel |
| 2014/0287711 A1 | 9/2014 | Williams et al. |
| 2015/0065077 A1* | 3/2015 | Kim ......... H04W 4/90 455/404.1 |
| 2016/0100045 A1* | 4/2016 | Raja ......... H04W 4/90 455/566 |

(Continued)

FOREIGN PATENT DOCUMENTS

| | | |
|---|---|---|
| CN | 101438574 A | 5/2009 |
| WO | 2013172680 A1 | 11/2013 |

OTHER PUBLICATIONS

3GPP TS 33.203 V15.0.0; 3rd Generation Partnership Project; Technical Specification Group Services and System Aspects; 3G Security; Access Security for IP-Based Services; Release 15; Sep. 2017; 145 pages.

(Continued)

*Primary Examiner* — Maria El-Zoobi
(74) *Attorney, Agent, or Firm* — Conley Rose, P.C.; J. Robert Brown, Jr.

(57) ABSTRACT

A method comprising transmitting, by a user equipment (UE) to a network node, a registration message comprising at least one of a first indicator configured to indicate emergency call information display capability, a second indicator configured to indicate language information, or a third indicator configured to indicate a status of previously received emergency information, and receiving, by the user equipment from the network node, a registration accept message.

12 Claims, 11 Drawing Sheets

(56) References Cited

U.S. PATENT DOCUMENTS

| 2018/0213384 A1 | 7/2018 | Youn et al. |
| 2019/0174449 A1 | 6/2019 | Shan et al. |
| 2021/0219122 A1 | 7/2021 | Buckley et al. |

OTHER PUBLICATIONS

Canpolat, Necati, et al.; "TGu Single GAS Protocol"; 802.11-10/0266r49; Mar. 18, 2010; 64 pages.
European Extended Search Report; Application No. 23173482.3; Aug. 7, 2023; 14 pages.
Chinese Office Action; Application No. 201980045537.0; Sep. 7, 2023; 17 pages.
3GPP TSG-CN Meeting #18; "Downloading of Local Emergency Numbers to the Mobile Station"; NP-020674; New Orleans, USA; Dec. 4-6, 2002; 15 pages.
3GPP TSG-CT WG1 Meeting #110; "Storage of Extended Local Emergency Numbers"; C1-182405; Kunming (P.R. of China); Apr. 16-20, 2018; 3 pages.
Office Action dated Sep. 8, 2021; U.S. Appl. No. 17/057,559, filed Nov. 20, 2020; 12 pages.
Final Office Action dated May 20, 2022; U.S. Appl. No. 17/057,559, filed Nov. 20, 2020; 18 pages.
Office Action dated Aug. 9, 2022; U.S. Appl. No. 17/057,559, filed Nov. 20, 2020; 14 pages.
Notice of Allowance dated Dec. 19, 2022; U.S. Appl. No. 17/057,559, filed Nov. 20, 2020; 10 pages.
PCT International Search Report & Written Opinion of the International Searching Authority; PCT/EP2019/063155; Sep. 11, 2019; 27 pages.
European Examination Report; Application No. 19726633.1; Feb. 7, 2022; 13 pages.

* cited by examiner

4.2.XX  EF_EECC (Extended Emergency Call Codes)

This EF contains the extended emergency call codes.

| Identifier: '6FXX' | | Structure: linear fixed | |
|---|---|---|---|
| Record size: Xbytes | | Update activity: low | |

Access Conditions:
    READ                ALW
    UPDATE          ADM
    DEACTIVATE    ADM
    ACTIVATE       ADM

| Bytes | Description | M/O | Length |
|---|---|---|---|
| 1-3 | PLMN identity | M | 3 |
| 4 to X | Extended Emergency Number List IE | O | X bytes |

PLMN identity encoding
Contents:
    Mobile Country Code (MCC) followed by the Mobile Network Code (MNC).
Coding:
    according to TS 24.008 [9].
    For instance, using 246 for the MCC and 81 for the MNC and if this is stored in PLMN 3 the contents is as follows:
Bytes 7 to 9:    '42' 'F6' '18'.
    If storage for fewer than n PLMNs is required, the unused bytes shall be set to 'FF'.

FIG. 8A

Extended Emergency Number List IE coding:

| 8 | 7 | 6 | 5 | 4 | 3 | 2 | 1 | |
|---|---|---|---|---|---|---|---|---|
| colspan="8" | Extended Emergency Number List IE | octet 1 |
| colspan="8" | Length of Extended Emergency Number List IE contents | octet 2<br>octet 3 |
| colspan="8" | Country character 1 (Note 0) | octet 4 |
| colspan="8" | Country character 2 (Note 0) | octet 5 |
| CSEU | 1st TDP (Note 6) | colspan="6" | Length of 1st Emergency Number information (Note 1) | octet 6 |
| colspan="4" | Number digit 2 | colspan="4" | Number digit 1 | octet 7 (Note 2) |
| colspan="4" | Number digit 4 | colspan="4" | Number digit 3 | octet 8* |
| colspan="4" | : | colspan="4" | : | : |
| colspan="4" | (Note 3) | colspan="4" | | octet j-1* |
| | Length of 1st sub-services field (Note 4) | |
| colspan="8" | sub-services field | octet j+1*<br>(Note 5)<br>octet k-1* |
| | Number of Textual descriptions included | |
| colspan="8" | Length of 1st textual description | octet k*<br>(Note 7) |
| colspan="8" | 1st textual description | octet k+1*<br>(Note 8)<br>octet l-1* |
| | Length of 2nd textual description for 1st emergency number information | |
| | 2nd textual description for 1st emergency number information | |
| CSEU | 2nd TDP (Note 6) | colspan="6" | Length of 2nd Emergency Number information (Note 1) | octet l* |
| colspan="4" | Number digit 2 | colspan="4" | Number digit 1 | octet l+1*<br>(Note 2) |
| colspan="4" | Number digit 4 | colspan="4" | Number digit 3 | octet l+2* |
| colspan="4" | : | colspan="4" | : | : |
| colspan="4" | (Note 3) | colspan="4" | : | octet m-1* |
| colspan="8" | Length of 2nd sub-services field (Note 4) | octet m* |
| colspan="8" | sub-services field | octet m+1*<br>(Note 5)<br>octet n-1* |
| | Number of Textual descriptions included | |

FIG. 8B

| | | | |
|---|---|---|---|
| | Length of 2nd textual description | | octet n* (Note 7) |
| | 2nd textual description | | octet n+1* (Note 8) octet o-1* |
| | Length of 2nd textual description for 2$^{nd}$ emergency number information | | |
| | 2nd textual description for 2$^{nd}$ emergency number information | | |
| CSEU | 3rd TDP (Note 6) | Length of 3$^{rd}$ Emergency Number information (Note 1) | octet o* |
| Number digit 2 | | Number digit 1 | octet o+1* (Note 2) |
| Number digit 4 | | Number digit 3 | octet o+2* |
| : | | : | : |
| (Note 3) | | : | octet p-1* |
| | Length of 3$^{rd}$ sub-services field (Note 4) | | octet p* |
| | sub-services field | | octet p+1* (Note 5) octet q-1* |
| | Length of 3rd textual description | | octet q* (Note 7) |
| | 3rd textual description | | octet q+1* (Note 8) octet r* |

NOTE 0: The characters of the country code shall be coded in accordance to 3GPP TS 23.038 [3] and the first character starts in octet 4. The country character 1 and 2 field contents are undefined when none of the CSEUs in the IE are set to '1'.
NOTE 1: The length shall contain the number of octets used to encode the number digits. An Emergency Number cannot contain more than 63 Number digits.
NOTE 2: The number digit(s) in octet 5 precedes the digit(s) in octet 6 etc. The number digit, which would be entered first, is located in octet 6, bits 1 to 4. The contents of the number digits are coded as shown in table 10.5.118/3GPP TS 24.008 [13].
NOTE 3: If the emergency number contains an odd number of digits, bits 5 to 8 of the last octet of the respective emergency number shall be filled with an end mark coded as "1111".
NOTE 4: The length shall contain the number of octets used to encode the sub-services field.
NOTE 5: The characters of the sub-services of the associated emergency service URN shall be coded in accordance to 3GPP TS 23.038 [3] and the first character starts in octet j+1.
NOTE 6: TDP (textual description present) bit set to zero indicates that the length of textual description field and the textual description field are absent. TDP bit set to one indicates that the length of textual description field and the textual description field are present.
NOTE 7: The length of textual description field shall contain number of octets used to encode the textual description field.
NOTE 8: The textual description field is coded according to figure 9.9.3.37A.2 and table 9.9.3.37A.2.

Figure 4.2.XX.1 Extended Emergency Number List IE

FIG. 8C

Table 4.2.XX.1: Extended Emergency Number List information element

CSEU, Country Specific Emergency URN (octet 4, k, m, etc.)
Bit
1
1   The sub-services field contains zero or more sub-services of the country specific emergency URN (see 3GPP TS 24.229 [13D])
0   The sub-services field contains zero or more sub-services EXAMPLE 1:   if the associated CSEU is set to '0', the associated emergency service URN is "urn:service:sos.gas", when there is only one sub-service provided in the sub-services field which is "gas".

EXAMPLE 2:   if the associated CSEU is set to '0', the associated emergency service URN is "urn:service:sos", when there is no sub-services provided in the sub-services field and the length of the sub-services field is "0".

EXAMPLE 3:   if the associated CSEU is set to '0', the associated emergency service URN is "urn:service:sos.gas", when the sub-services field contains "gas" and the first character is "g".

EXAMPLE 4:   if the associated CSEU is set to '0', the associated emergency service URN is "urn:service:sos.police.municipal", when the sub-services field contains "police.municipal" and the first character is "p".

EXAMPLE 5:   if the associated CSEU is set to '1', the associated emergency service URN is "urn:service:sos.country-specific.xy.anti-terrorism", when country character 1 is 'x', country character 2 is 'y', the sub-services field contains "anti-terrorism" and the first character is "x".

EXAMPLE 6:   if the associated CSEU is set to '1', the associated emergency service URN is "urn:service:sos.country-specific.xy.567", when the length of the sub-services field is "0", country character 1 is 'x', country character 2 is 'y', and the associated number digits are "567".

| 8 | 7 6 5 | 4 | 3 2 1 | |
|---|---|---|---|---|
| 0 Spare | Coding scheme | 0 Spare | Number of spare bits in last octet | octet k+1 |
| Text string | | | | octet k+2 |
| | | | | octet l-1 |

Figure 4.2.XX.2: textual description

FIG. 8D

| Table 4.2.XX..2: textual description |
|---|

Number of spare bits in last octet (octet k+1, bits 1 to 3)
| 3 | 2 | 1 | |
|---|---|---|---|
| 0 | 0 | 1 | bit 8 is spare and set to "0" in octet l-1 |
| 0 | 1 | 0 | bits 7 and 8 are spare and set to "0" in octet l-1 |
| 0 | 1 | 1 | bits 6 to 8(inclusive) are spare and set to "0" in octet l-1 |
| 1 | 0 | 0 | bits 5 to 8(inclusive) are spare and set to "0" in octet l-1 |
| 1 | 0 | 1 | bits 4 to 8(inclusive) are spare and set to "0" in octet l-1 |
| 1 | 1 | 0 | bits 3 to 8(inclusive) are spare and set to "0" in octet l-1 |
| 1 | 1 | 1 | bits 2 to 8(inclusive) are spare and set to "0" in octet l-1 |
| 0 | 0 | 0 | this field carries no information about the number of spare bits in octet l-1 |

Coding scheme (octet k+1, bits 5 to 7)
| 7 | 6 | 5 | |
|---|---|---|---|
| 0 | 0 | 0 | Cell Broadcast data coding scheme, GSM default alphabet, language unspecified, defined in 3GPP TS 23.038 [3] |
| 0 | 0 | 1 | UCS2 (16 bit), defined in ISO/IEC 10646 [29] |

All other values are reserved.

Text string (octet k+2 to octet l-1)
Contains textual description of the emergency service encoded according to the coding scheme indicated by the coding scheme field.

If the coding scheme is set to "UCS2 (16 bit), defined in ISO/IEC 10646 [29]" and Chinese-Japanese-Korean-Vietnamese (CJKV) ideographs as defined in ISO/IEC 10646 [29] are received in the text string field, the UE shall use the MCC of the PLMN from which it received the Extended emergency number list information element to determine the language for those CJKV ideographs as specified in table 9.9.3.37A.3:

Table 4.2.XX.3: MCC to CJKV ideograph language mapping table

| MCC(s) | Country/Region | Language (C, J, K, or V) |
|---|---|---|
| 460, 461 | Mainland China | Chinese-G |
| 466 | Taiwan | Chinese-T |
| 454 | HongKong | Chinese-T |
| 455 | Macao | Chinese-T |
| 440, 441 | Japan | J (Kanji) |
| 450, 467 | Korea | K (Hanja) |
| 452 | Vietnam | V (Chunom) |

NOTE 2: This is due to CJKV ideograph language ambiguity in UCS2, in the sense that the same hexadecimal code can be mapped to different character displays dependent on the used language. The coding of CJKV ideographs itself does not allow to discriminate the CJKV ideograph language.

FIG. 8E

SUPPORT OF EMERGENCY NUMBER DESCRIPTIONS

CROSS-REFERENCE TO RELATED APPLICATIONS

This application is a continuation of U.S. patent application Ser. No. 17/057,559 filed Nov. 20, 2020, which is a U.S. National Stage of International Patent Application No. PCT/EP2019/063155 filed May 21, 2019, which claims priority to U.S. Provisional Application No. 62/674,464 filed May 21, 2018, all of which are incorporated by reference herein as if reproduced in their entireties.

FIELD OF THE DISCLOSURE

The present disclose relates to emergency calls or sessions, and in particular to support of emergency number descriptions.

BACKGROUND

An emergency call or session is a special type of call or session. It usually has a higher priority than other calls in a network, its bearers have different characteristics than other calls, e.g., the bearers could have one or more of a higher priority or higher Quality of Service (QOS). In situations of congestion other non-emergency calls may be released to allow an emergency call to be made or to continue.

BRIEF DESCRIPTION OF THE DRAWINGS

The present disclosure will be better understood with reference to the drawings, in which:

FIG. 8A is a first portion of a diagram of an embodiment of proposed changes to 3GPP TS 31.102.

FIG. 8B is a second portion of a diagram of an embodiment of proposed changes to 3GPP TS 31.102.

FIG. 8C is a third portion of a diagram of an embodiment of proposed changes to 3GPP TS 31.102.

FIG. 8D is a fourth portion of a diagram of an embodiment of proposed changes to 3GPP TS 31.102.

FIG. 8E is a fifth portion of a diagram of an embodiment of proposed changes to 3GPP TS 31.102.

DESCRIPTION

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Emergency calls are usually made to well known numbers in a country/area e.g., 112, 911, 999, etc. Emergency calls may be terminated at special facilities called Public Safety Access Points (PSAP). In 3GPP systems, emergency calls are described in 3GPP TS 23.167, which is incorporated by reference herein in its entirety.

Emergency numbers may be region or country specific. Depending on how fast a regulator of emergency numbers introduces new emergency services, home subscribers may or may not be aware of all the emergency numbers and their associated services. However, roaming users may not be familiar with them. Some countries introduce emergency numbers at a fast rate: For example, France has added 6 emergency services in the last 10 years. France has now reserved and uses the following emergency numbers: 112, 15, 17, 18, 115, 119, 116000, 114, 191, 196, 197, 116117. European regulation may be interpreted by the member country regulators as advising to reserve the 116-ABC block of numbers for emergency services. More emergency services are likely to be defined and a menu with a textual description would increase the adoption rate thereof by user equipment (UE) users.

Some emergency numbers are region specific. In order to assist the user in making a call to the correct emergency number, a device may indicate to a user the types of emergency calls or services that can be placed or handled by displaying a menu or using a Man Machine Interface (MMI) that uses (e.g., display, render, text to speech) textual descriptions instead of numbers e.g., Police, Fire, Ambulance, Mountain Rescue, Dog Catcher, or the descriptions for emergency services associated with various emergency contact numbers.

Figure 1:
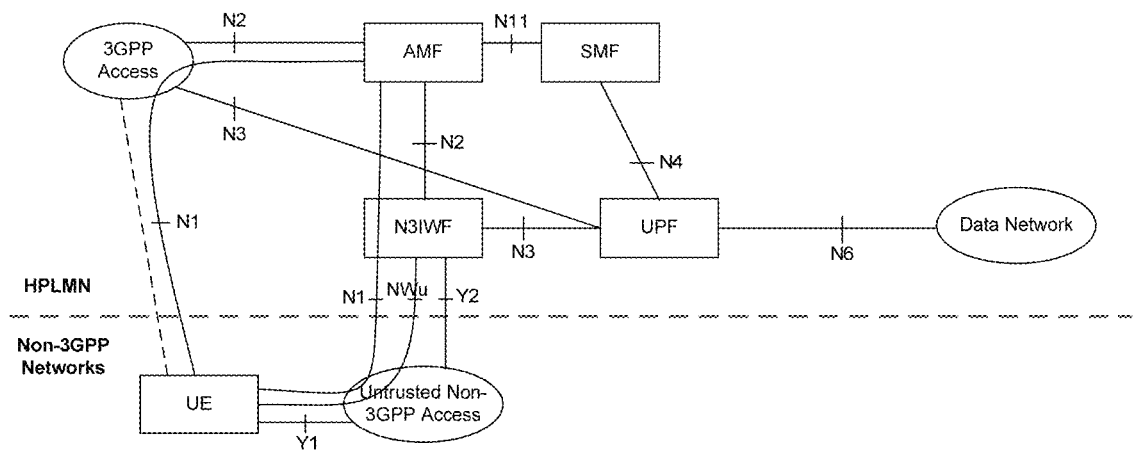
FIG. 1 is a diagram of an embodiment of an overview of a 5G network architecture.

FIG. 1 provides an overview of the 5G network architecture. The Access and Mobility Management function (AMF) includes the following functionality. Some or all of the AMF functionalities may be supported in a single instance of an AMF: termination of radio access network (RAN) control plane (CP) interface (N2), termination of non-access stratum (NAS) (N1), NAS ciphering and integrity protection, registration management, connection management, reachability management, mobility management, lawful intercept (for AMF events and interface to LI System), transparent proxy for routing short message (SM) messages, access authentication, access authorization, security anchor function (SEA) —it interacts with the AUSF and the UE, receives the intermediate key that was established as a result of the UE authentication process. In case of universal subscriber identity module (USIM) based authentication, the AMF retrieves the security material from the AUSF, security Context Management (SCM) —the SCM receives a key from the SEA that it uses to derive access-network specific keys. Regardless of the number of Network functions, there is only one NAS interface instance per access network between the UE and the CN, terminated at one of the Network functions that implements at least NAS security and mobility management. In addition to the functionalities of the AMF described above, the AMF may include the following functionality to support non-3GPP access networks: support of N2 interface with N3IWF—over this interface, some information (e.g., 3GPP cell Identification) and procedures (e.g., Hand-Over related) defined over 3GPP access may not apply, and non-3GPP access specific information may be applied that do not apply to 3GPP accesses, support of NAS signaling with a UE over N3IWF. Some procedures supported by NAS signaling over 3GPP access may be not applicable to untrusted non-3GPP (e.g., Paging) access: support of authentication of UEs connected over N3IWF, management of mobility and authentication/security context state(s) of a UE connected via non-3GPP access or connected via 3GPP and non-3GPP accesses simultaneously, support as described in clause 5.3.2.3 a coordinated RM management context valid over 3GPP and non-3GPP accesses, support as described in clause 5.3.3.4 of 3GPP TS23.501 dedicated CM management contexts for the UE for connectivity over non-3GPP access. Not all of the functionalities are required to be supported in an instance of a network slice. The Session Management function (SMF) includes the following functionality. Some or all of the SMF functionalities may be supported in a single instance of a SMF. The User plane function (UPF) includes the following functionality. Some or all of the UPF functionalities may be supported in a single instance of a UPF. The Unified Data Management (UDM) supports the following functionality: supports Authentication Credential Repository and Processing Function (ARPF) —this function stores the long-term security credentials used in authentication for AKA, stores subscription information. User data repository (UDR) could be present within the UDM. The interaction between UDM and HSS is implementation specific.

Figure 2:
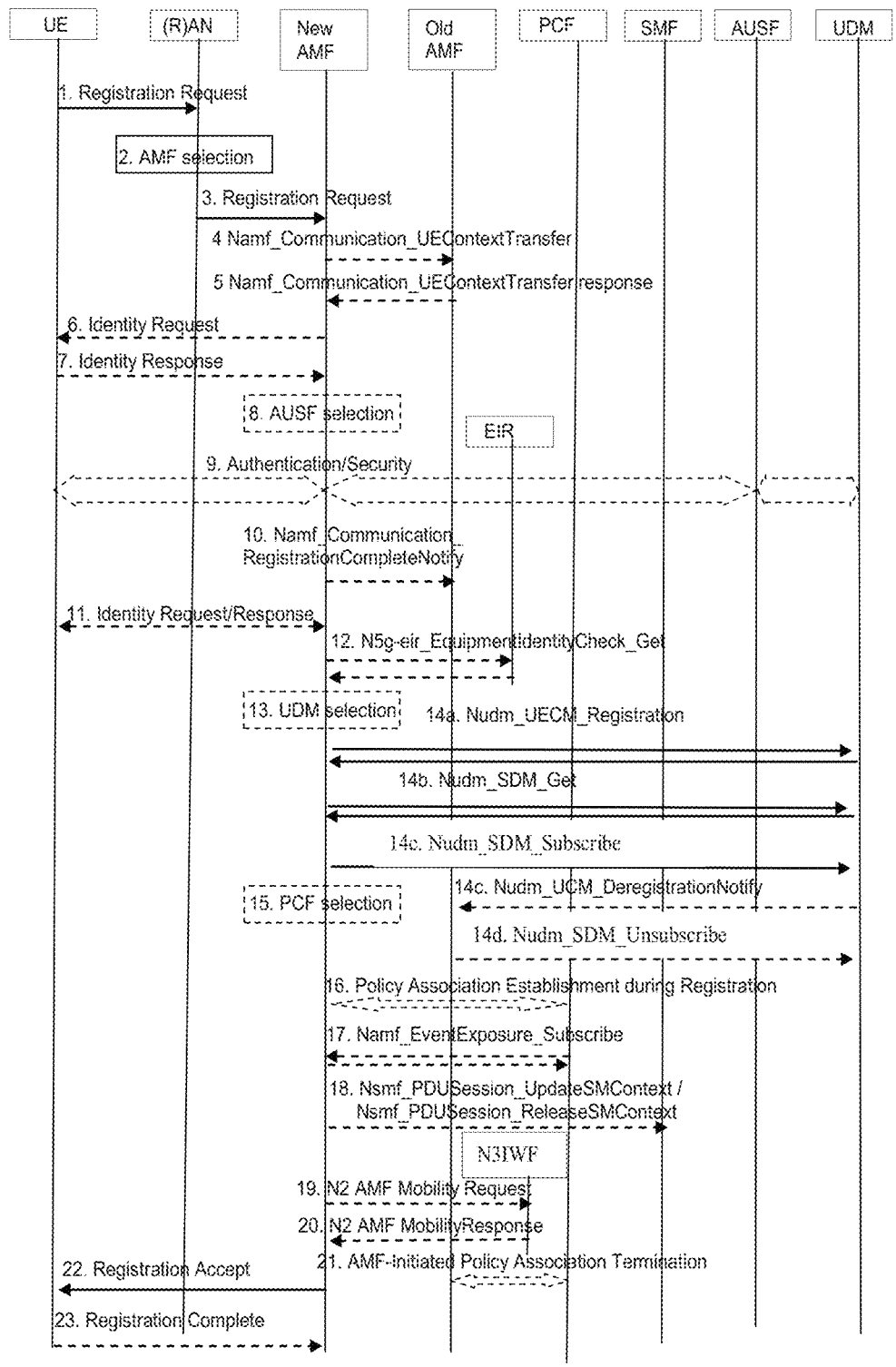
FIG. 2 is diagram of an embodiment of the registration process in a 5G network.

FIG. 2 is diagram of an embodiment of the registration process in a 5G network. A portion of the steps are described below:

1. UE to (R)AN: AN message (AN parameters, Registration Request (Registration type, SUCI or 5G-GUTI or PEI, last visited TAI (if available), Security parameters, Requested NSSAI, [Mapping Of Requested NSSAI], UE 5GC Capability, PDU Session status, List Of PDU Sessions To Be Activated, Follow on request, MICO mode preference, Requested DRX parameters, UE support of Request Type flag "handover" during the attach procedure) and the list of PSIs).

2. The (R)AN selects an AMF as described in TS 23.501 [2], clause 6.3.5.

3. (R)AN to new AMF: N2 message (N2 parameters, Registration Request (as described in step 1) and UE access selection and PDU session selection information).

When NG-RAN is used, the N2 parameters include the Selected PLMN ID, Location Information, Cell Identity and the RAT type related to the cell in which the UE is camping.

When NG-RAN is used, the N2 parameters also include the Establishment cause.

Mapping Of Requested NSSAI is provided only if available.

If the Registration type indicated by the UE is Periodic Registration Update, then steps 4 to 20 may be omitted.

14a-b. If the AMF has changed since the last Registration procedure, or if the UE provides a SUPI which doesn't refer to a valid context in the AMF, or if the UE registers to the same AMF it has already registered to a non-3GPP access (i.e., the UE is registered over a non-3GPP access and initiates this Registration procedure to add a 3GPP access), the new AMF registers with the UDM using Nudm_UECM_Registration and subscribes to be notified when the UDM deregisters this AMF. The UDM stores the AMF identity associated to the Access Type and does not remove the AMF identity associated to the other Access Type. The UDM may store information provided at registration in UDR, by Nudr_UDM_Update.

The AMF retrieves the Access and Mobility Subscription data, SMF Selection Subscription data and UE context in SMF data using Nudm_SDM_Get. This requires that UDM may retrieve this information from UDR by Nudr_UDM_Query. After a successful response is received, the AMF subscribes to be notified using Nudm_SDM_Subscribe when the data requested is modified, UDM may subscribe to UDR by Nudr_UDM_Subscribe. The GPSI is provided to the AMF in the Access and Mobility Subscription data from the UDM if the GPSI is available in the UE subscription data.

The new AMF provides the Access Type it serves for the UE to the UDM and the Access Type is set to "3GPP access". The UDM stores the associated Access Type together with the serving AMF in UDR by Nudr_UDM_Update.

The new AMF creates an MM context for the UE after getting the Access and Mobility Subscription data from the UDM.

For an Emergency Registration in which the UE was not successfully authenticated, the AMF shall not register with the UDM.

For an Emergency Registration, the AMF shall not check for access restrictions, regional restrictions or subscription restrictions. For an Emergency Registration, the AMF shall ignore any unsuccessful registration response from UDM and continue with the Registration procedure.

14c. When the UDM stores the associated Access Type (e.g., 3GPP) together with the serving AMF as indicated in step 14a, it will cause the UDM to initiate a Nudm_UECM_DeregistrationNotification (see clause 5.2.3.2.2) to the old AMF corresponding to the same (e.g., 3GPP) access, if one exists. The old AMF removes the MM context of the UE. If the serving NF removal reason indicated by the UDM is Initial Registration, then, as described in clause 4.2.2.3.2, the old AMF invokes the Nsmf_PDUSession_ReleaseSMContext (SUPI, PDU Session ID) service operation towards all the associated SMF(s) of the UE to notify that the UE is deregistered from the old AMF. The SMF(s) shall release the PDU Session on receiving this notification.

14d. The old AMF unsubscribes with the UDM for subscription data using Nudm_SDM_unsubscribe.

22. New AMF to UE: Registration Accept (5G-GUTI, Registration Area, Mobility restrictions, PDU Session status, Allowed NSSAI, [Mapping Of Allowed NSSAI], [Configured NSSAI for the Serving PLMN], [Mapping Of Configured NSSAI], Periodic Registration Update timer, LADN Information and accepted MICO mode, IMS Voice over PS session supported Indication, Emergency Service Support indicator, Accepted DRX parameters, Network support of Interworking without N26).

SIP is a protocol that is used for session creation, management, and deletion. It is a textual protocol that is defined in RFC 3261 and has been further expanded over the years to include new functionality. Sessions are directed by means of a URI, either a SIP URI that has a format that looks like username@domain where both username and domain can consist of one to many multiple labels that can be separated by a full stop or explanation mark. Or URI can be a tel URI which is basically an encoded telephone number.

When an emergency call is made a specific uniform resource identifier (URI) is used so that the network can recognize that the call is emergency in nature. It may have a label of "sos" in it and this URI maybe called a uniform resource name (URN).

Figure 3:
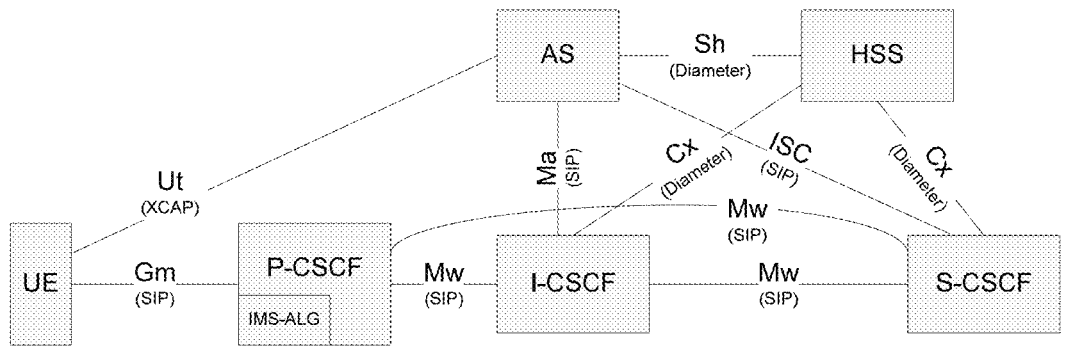
FIG. 3 is a diagram of and embodiment of an internet protocol (IP) multimedia subsystem (IMS) in a 4G network.

In 3GPP session initiation protocol (SIP) is used within an internet protocol (IP) Multimedia Subsystem (IMS). FIG. 3 is a block diagram of IMS in a 4G network. An IMS network can be attached to a 4G network. An IMS network consists of a number of functional elements, some of which are described below.

P-CSCF: Proxy Call Session Control Function. It is the first point of entry into the IMS network.

S-CSCF: Serving Call Session Control Function. This handles the sessions in the network and routes SIP messages to appropriate IMS AS's and P-CSCF's.

I-CSCF: Interrogating Call Session Control Function. It is used as entry point to find a subscriber in the network and assist in assigning S-CSCF when a subscriber registers in the network.

AS: Application Server. This function typically provides service specific functionality. Some examples of Ass include:

TAS: MMTel AS. This is typically used to provide service logic and control for telephony services e.g. voice, video, etc.

SCC AS: Service Centralization and Continuity AS. This is typically used to provide service logic and control for centralizing services between CS and IMS in the IMS and handing over of SIP sessions and their associated media between UEs and/or across different IP networks.

HSS: Home Subscriber Server. This is the database that contains the subscribers profile (identities, what services they have subscribed to), provides location functionality as well at the necessary authentication database.

IMS AS: The IMS Application server. This has the logic/software that executes services for an IMS subscriber. There may be 0 to many of these in the network.

Figure 4:
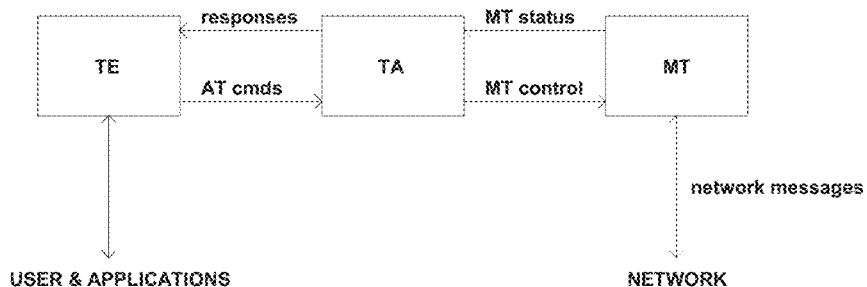
FIG. 4 is a diagram of an embodiment of an attention (AT) command architecture.

AT commands provide a solution to enable upper layers of an ME (e.g. application layer) to write data, read data or force execution of a procedure by lower layers of an ME (e.g., modem chipset). AT commands are described in 3GPP TS 27.007. A summary of the architecture is shown in FIG. 4. AT commands may be used for controlling Mobile Termination (MT) functions and GSM/UMTS network services from a Terminal Equipment (TE) through Terminal Adaptor (TA). An abstract architecture comprising a TE (e.g., a computer) and a MT interfaced by a TA are shown in FIG. 4. The span of control of the defined commands should allow handling of any physical implementation that this abstract architecture may lead to: e.g., TA, MT and TE as three separate entities; TA integrated under the MT cover, and the TE implemented as a separate entity; TA integrated under the TE cover, and the MT implemented as a separate entity; and TA and MT integrated under the TE cover as a single entity. The commands described may be observed on the link between the TE and the TA. However, most of the commands retrieve information about the MT, not about the TA.

Figure 5:
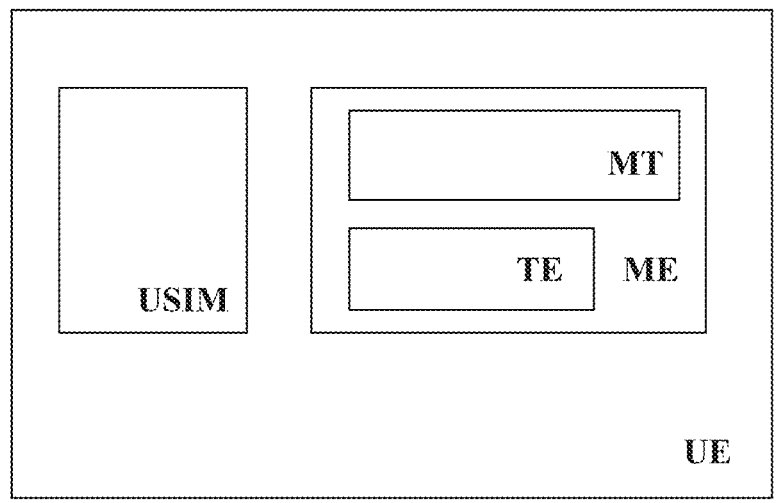
FIG. 5 is a diagram of an embodiment a functional model for a user equipment (UE).

FIG. 5 is a diagram of a functional model for a user equipment (UE) as described in 3GPP TS 23.003, which is incorporated herein in its entirety. A basic architectural split is between the user equipment (terminals) and the infrastructure. This results in two domains: the User Equipment Domain and the Infrastructure domain.

User equipment is the equipment used by the user to access UMTS services (but is not limited to accessing UMTS services, the UE may also access 5G System (5GS) services or Evolved Packet System (EPS) services, etc.). User equipment has a radio interface to the infrastructure. The infrastructure consists of the physical nodes which perform the various functions required to terminate the radio interface and to support the telecommunication services requirements of the users. The infrastructure is a shared resource that provides services to all authorized end users within its coverage area.

The reference point between the user equipment domain and the infrastructure domain is termed the "Uu" reference point (UMTS radio interface) (when accessing non-UMTS services, other reference points are used to access the services of these systems). This description assumes an access interface based on UTRA. However, the physical and functional separation described herein is general and is applicable also if other access technologies are used.

The user equipment domain encompasses a variety of equipment types with different levels of functionality. These equipment types are referred to as user equipment (terminals), and they may also be compatible with one or more existing access (fixed or radio) interfaces e.g. dual mode UMTS-GSM user equipment (UE), EPS capable UE or 5GS capable UE or combinations there off. The user equipment may include a removable smart card that may be used in different user equipment types. The user equipment is further sub-divided in to the Mobile Equipment (ME) Domain and the User Services Identity Module (USIM) Domain. The reference point between the ME and the USIM is termed the "Cu" reference point.

For the purpose of 3GPP networks including the UMTS Cellular networks, 5GS Cellular networks or EPS Cellular networks (a cellular network could be a RAN or (R)AN), the following definition applies: User Equipment is a device allowing a user access to network services. For the purpose of 3GPP specifications the interface between the UE and the network is the radio interface. A User Equipment can be subdivided into a number of domains, the domains being separated by reference points. Currently defined domains are the USIM and ME Domains. The ME Domain can further be subdivided into several components showing the connectivity between multiple functional groups. These groups can be implemented in one or more hardware devices. An example of such a connectivity is the TE-MT interface. Further, an occurrence of User Equipment is an MS for GSM as defined in 3GPP TS 24.002, which is incorporated herein in its entirety.

Figure 6:
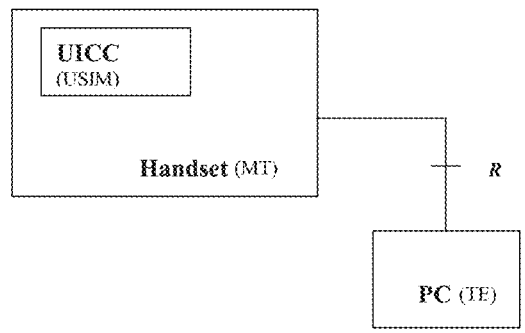
FIG. 6 is an embodiment of a physical configuration of the functional model of FIG. 5.

The 07- and 27-series technical specifications (TS) refer to physical instances of this Functional Model of FIG. 5. FIG. 6 shows an example of a physical configuration as it could be used in these specifications. The boxes, in this figure, refer to physical elements. The names within brackets are only provided to map the functional blocks from the figure above onto physical elements.

The Mobile Equipment performs radio transmission and contains applications. The mobile equipment may be further sub-divided into several entities, e.g. the one which performs the radio transmission and related functions, Mobile Termination (MT), and the one which contains the end-to-end application or (e.g., laptop connected to a mobile phone), Terminal Equipment (TE). This separation is used in the description of the functional communication in FIG. 3 but no reference point is defined in this specification.

The USIM contains data and procedures which unambiguously and securely identify itself. These functions are typically embedded in a stand alone smart card. This device is associated to a given user, and as such allows to identify this user regardless of the ME it uses.

The Infrastructure domain is further split into the Access Network Domain, which is characterized by being in direct contact with the User Equipment and the Core Network Domain. This split is intended to simplify/assist the process of de-coupling access related functionality from non-access related functionality and is in line with the modular principle adopted for the UMTS.

The Access Network Domain comprises roughly the functions specific to the access technique, while the functions in the Core network domain may potentially be used with information flows using any access technique. This split allows for different approaches for the Core Network Domain, each approach specifying distinct types of Core Networks connectable to the Access Network Domain, as well as different access techniques, each type of Access Network connectable to the Core Network Domain. The reference point between the access network domain and the core network domain is termed the "Iu" reference point. The split into the User Equipment Domain, the Access Network Domain, and the Core Network Domain is consistent with the GMM report.

The Access Network Domain consists of the physical entities which manage the resources of the access network and provides the user with a mechanism to access the core network domain. Additional reference points within the access domain may be identified in other specifications.

The Core Network Domain consists of the physical entities which provide support for the network features and telecommunication services. The support provided includes functionality such as the management of user location information, control of network features and services, the transfer (switching and transmission) mechanisms for signalling and for user generated information. The core network domain is sub-divided into the Serving Network Domain, the Home Network Domain, and the Transit Network Domain. The reference point between the serving network domain and the home network domain is termed the [Zu] reference point. The reference point between the serving network domain and the transit network domain is termed the [Yu] reference point. Additional sub-divisions and reference points within the core network domain may be identified in other specifications.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The EPS and GPRS system and GSM system deployed a solution by which emergency numbers (and associated 5 bit categories (see 3GPP TS 24.008)) are provided to the UE via e.g., EPS messages ATTACH ACCEPT and TRACKING AREA UPDATE ACCEPT. This solution has also been defined for 5G. However for 5G (and in the IMS in general) it is expected that emergency calls will be made using SIP and as such, URNs need to be delivered to UEs. These URNs provide for more flexibility in identifying a wider variety of emergency services (more than the services that can be identified using the 5 bit category defined in TS 24.008). However users are not able to decipher which emergency services are invoked using the number or URN without prior knowledge. 3GPP TS 22.101 has a requirement that a user friendly MMI is available to the user so they are aware of the emergency calls they can make. However the current proposal has the following problems: 1) if a UE does not have a screen e.g., IoT device like BlackBerry RADAR there is no need to receive a textual description of the numbers. It wastes memory in the device and consumes battery power to receive it when it will never be used; and 2) the local language might be different to that of the roaming user. To ensure that the information that is provided is of value it needs to be in the language the user of the UE can understand. If the UE has previously received the information it should be able to indicate that it has the information so it does not need to receive it again.

Not only is periodic indication of emergency service description needless if they are stored at the UE, also storage of emergency service identifiers (including emergency numbers, URNs, categories) could be indicated. This way a device doesn't need to receive them needlessly, and this may preserve battery memory, and processing cycles at the UE.

In an embodiment of the solution applied in a UE or a network node, the UE may receive from the network emergency identifiers or description of emergency identifiers. The network may send to the UE emergency identifiers or description of emergency identifiers. Description of emergency identifiers include several characters in a particular encoding or in a particular language. More than one description for the same emergency identifier could be provided by the network to the UE. A UE receives these emergency identifiers or description of emergency identifiers in a message from the network. The network may send these emergency identifiers or description of emergency identifiers in the message to the UE. This message could include a registration accept message. The UE may indicate to the network one or more indicators. These indicators govern whether to provide emergency identifiers or description of emergency identifiers in the message from the network, what language or encoding to provide them in. The UE may provide these indicators to the network in a registration message. The network may receive these indicators in a registration message. These one or more indicators may include one or more of indicators A, B, or C as described below.

Indicator A may consist of or one or more indicators. Indicator A may indicate one or more of: that the UE supports an MMI (e.g., user friendly MMI) capable of indicating one or more the types of emergency call services, for example "police", "anti-terrorism", etc.; that the UE supports a display; that the ME can inform the upper layers of the descriptions of emergency identifiers; that the UE can store descriptions of emergency identifiers; that the UE can store up to a number N of descriptions of emergency identifiers. The message comprising indicator A could then further comprise the number N.

Indicator B may consist of or one or more indicators. Indicator B may indicate one or more of: one or more of the languages or encodings supported by the UE; one or more of the languages or encodings preferred by the UE; one or more of the languages or encodings supported by the user. Upon receipt of indicator B, the network may select one or more descriptions of emergency identifiers in languages or encodings as indicated by indicator B. The selection is based on using B as an input to determine a description of emergency identifiers from a list for an emergency identifier, the list stored in the network.

Indicator C may consist of or one or more indicators. Indicator C may indicate one or more of: an indication that the UE has stored previously received descriptions of emergency identifiers, the previously received descriptions of emergency identifiers may be stored in ME memory, secure memory module or UICC, the previously received descriptions of emergency identifiers may have been provisioned in the UICC; an indication representing previously received descriptions of emergency identifiers. The indication may be the result of a hashing function, the hashing function may have hashed the previously received descriptions of emergency identifiers, the indication may have been received from the network, upon receipt of the indication representing previously received descriptions of emergency identifiers, the network matches the received indication with a second indication, available at the network, if the received indication and the second indication match, the network refrains from including the descriptions of emergency identifiers in the message from the network, if the received indication and the second indication do not match, the network includes the descriptions of emergency identifiers in the message from the network; an indication representing previously received emergency identifiers, the indication may be the result of a hashing function, the hashing function may have hashed the previously received emergency identifiers, the indication may have been received from the network, upon receipt of the indication representing previously received emergency identifiers, the network matches the received indication with a second indication, available at the network, if the received indication and the second indication match, the network refrains from including the emergency identifiers in the message from the network, if the received indication and the second indication do not match, the network includes the emergency identifiers in the message from the network; an indication that the UE no longer stores any previously received descriptions of emergency identifiers, this indication may be causes by a power cycle or other event that cleared the memory with any previously received descriptions, an indication implying the UE supports handling of descriptions of emergency identifiers.

The UE may not indicate to the network one or more of these indicators (indicators A, B, or C). The network may not receive from the UE one or more of these indicators. Absence of these indicators means one or more of: the UE does not support that functionality that was not indicated, the functionality represented by indicator A, B, or C had the indicator been present; or the UE has no preference for that functionality and default behavior, depending on the absent indicator, is defined in the network. The default behavior could, for example, be to select one or more languages based on the PLMN (MCC, MNC pair), wherein PLNM is the Home PLMN for the UE.

The UE may receive a registration accept message in response to sending a registration message. The network may send a registration accept message in response to receiving a registration message.

When the network received at least one of indicators A, B, or C in a registration message, and the network determines that descriptions of emergency identifiers need to be included in a response, then the network determines the encoding or language to use to transmit the descriptions of emergency identifiers. The network may consider (Mobile Country Code) MCC contained in the register message e.g. in IMSI, SUCI, MCC received from the UDM, HSS, or HLR in subscription data e.g. in IMSI, SUCI, or the contents of indicator B, if received.

When the network does not receive at least one of indicators A, B, or C in a registration message, the following actions may be taken in a UE, the UE sends an indication in a $1^{st}$ message e.g., a registration message. The indication can indicate one or more of the following: ME (comprised within the UE) supports receipt of description of emergency identifiers; wherein receipt indicates the ME supports a display, or can send the description of emergency identifier to a display; wherein receipt indicates the UE supports a user friendly MMI capably of indicating the type of emergency call. ME is operating in a specific language; UE supports prior provisioned description of emergency identifier descriptions; provisioning can either be in ME memory, secure memory module or UICC, this indication could include information about the stored numbers, e.g. a hash. The stored descriptions need to be ordered prior to the hash being taken, the UE has power cycled since last sending of $1^{st}$ message. An indication that description of emergency identifiers are stored, this indication could include information about the stored numbers, e.g., a hash. The stored identifiers need to be ordered prior to the hash being taken. The UE may receive in a $2^{nd}$ message: a list of description of emergency identifiers, optionally containing description of emergency identifier in language, wherein the language for the descriptions is one sent in the first message, wherein the description of emergency identifier is a textual string; or no list of a list of description of emergency identifiers, as requested in the first message using the "indication that emergency identifiers are stored"; or a list of emergency identifiers, the list of a list of emergency identifiers different from a list of emergency numbers stored. Emergency identifier is an emergency URN, number, category, etc.

When the network does not receive at least one of indicators A, B, or C in a registration message, the following actions may be taken in a network node: receives $1^{st}$ message e.g., registration message, determines to send description of emergency identifier, further determining which description of emergency identifier to send from a zero to many stored description of emergency identifier, wherein the determining can be: using the identity that was sent from the UE e.g., MCC contained in the register message e.g., in IMSI, MCC received from the UDM in subscription data e.g., in IMSI, receipt of an indication of specific language received in the message, UE supports emergency identifier descriptions provisioned; and sending a $2^{nd}$ message containing description of emergency identifier, wherein the description of emergency identifier is in a specific language determined based on above, network node 1 is: AMF, P-CSCF, N3IWF, MME; network node 2 is: HSS, UDM, the $1^{st}$ Message may be: REGISTER, ATTACH, SIP REGISTER, TAU; the $2^{nd}$ Message may be: REGISTER ACCEPT, ATTACH ACCEPT, 200OK. If the UE has REGISTERED via non 3GPP access or previous REGISTRATION the network node may refrain from sending the description of emergency identifier. The refraining is not performed if the Network Node received an indication of a UE power cycle. The UE deletes the description of emergency identifier when it powers down.

When the network does not receive at least one of indicators A, B, or C in a registration message, the following actions may be taken in a network node: receives $1^{st}$ message, e.g., registration message; determines to send emergency identifier; The determining can be: matching a first indication received, the indication representing the emergency identifiers stored at the UE, with a second indication, the second indication representation the emergency identifiers available at the node. If the first indication and the second indication match, do not include the emergency identifiers available at the node in the registration accept message.

When the network does not receive at least one of indicators A, B, or C in a registration message, the following actions may be taken in a network node: receives 1$^{st}$ message e.g., registration message; determines to send emergency identifier. The determining can be: matching a first indication received, the indication representing the emergency identifiers stored at the UE, with a second indication, the second indication representation the emergency identifiers available at the node. If the first indication and the second indication do not match, include the emergency identifiers available at the node in the registration accept message. Optionally, include the second indication. The second indication is included for the UE to store and use when a registration message is received at the node from the UE.

Figure 7:
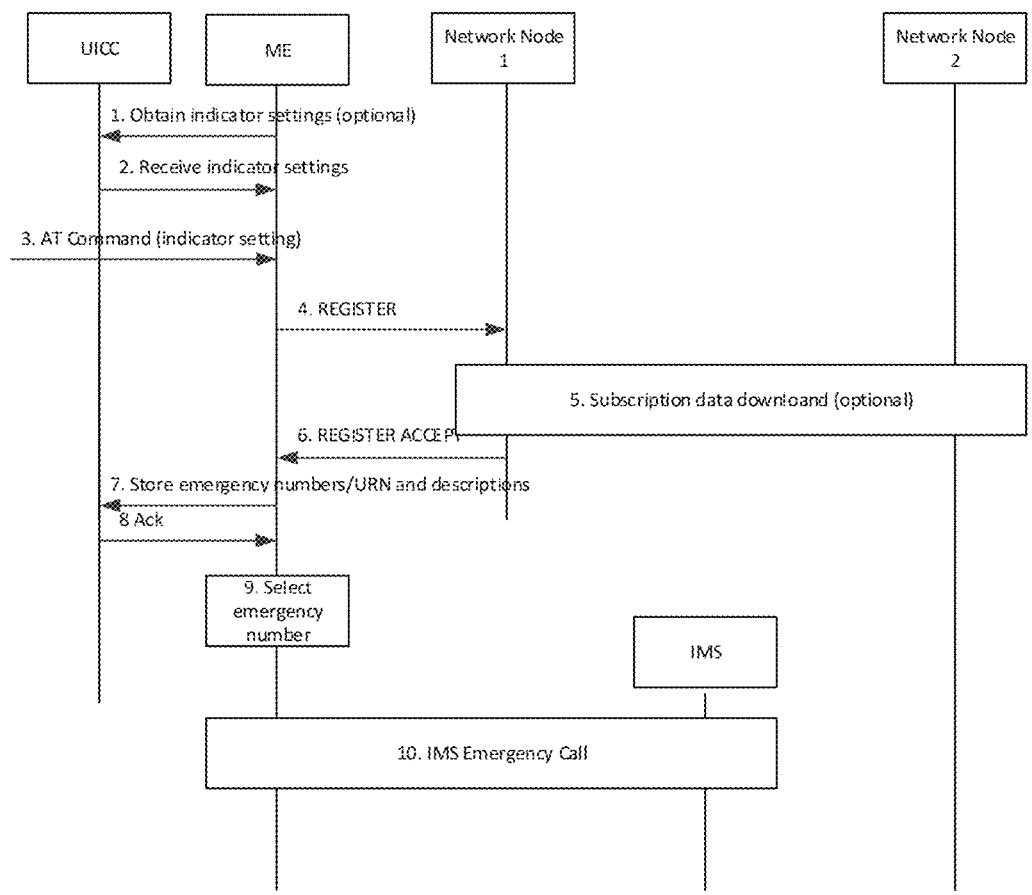
FIG. 7 is a message flow diagram of an embodiment of emergency number description procedures.

FIG. 7 is a message flow diagram of an embodiment of emergency number description procedures. The steps are described below.

1. (Optionally) ME sends a message #1 to an application on the UICC to read any indicators. E.g., the ME request the data from the language setting file stored on the USIM EF$_{LI}$; the UICC receives the message.

2. (Optionally) The UICC application sends message #2 including the requested data. The ME receives the message and stores the data.

3. (Optionally) The ME receives an AT command that sets one of the indicators (e.g., indicators A, B, or C).

4. UE sends message containing any of the following: private identity (e.g., IMSI, SIP URI); public Identity (MSISDN, SIP URI, tel URI); indication if the UE supports a display; indication of what language(s) the UE is configured to use; indication of what languages the UE prefers to use; supports receipt of descriptions of emergency identifier; the UE has power cycled since the last mobility management update to the network; the UE already has stored descriptions of emergency identifier.

5. Network Node 1 may download from network node 2 information to determine: what language descriptor to send to UE; the language descriptors associated with emergency numbers. The downloading may be achieved by sending Nudm_UECM_Registration to UDM.

6. Network Node 1 determines if language descriptors should be sent to the UE. This may be based upon any of the indications in step 4. Network Node 1 sends a message containing: in a language that was determined to be supported by UE a pointer.

7. (Optionally) ME sends the received identifier and descriptions of emergency identifier to UICC application, e.g., vis USAT command. UICC application receives the message and stores the data for possible embodiment.

8. (Optionally) UICC sends an ACK to ME

9. An MMI and or menu is displayed containing the descriptions of emergency identifiers. A description of emergency identifier is chosen and the associated emergency identifier will be used for an emergency call.

Certain information elements (IEs) may be enhanced or newly created for use of indicators A, B, or C described above. Emergency information includes emergency identifiers or description of emergency identifiers. This is an indicator part of "indicator B". The registration message and the registration accept message include IEs. Each indicator may comprise one or more IEs. The same IEs defined for an EPS can be reused in a 5GS. Indicator B indicates languages or encodings. Encodings are indicated using 3 bits. Languages can be indicated using various standards, e.g., ISO 639-1 (using 2 characters) or ISO 639-2 (using 3 characters). The standard used needs to be indicated. At a minimum a default standard needs to be supported by the network and UE. The default standards could be ISO 639-1. Optionally, ISO 639-2 may also be supported. Additional bits can be reserved to indicate other standards the UE uses or express the languages supported by the UE and user. At a minimum a language indicated in ISO 639-1 needs to be present. If a language is not supported by the network, the network can provide the description of emergency identifiers in a language and encoding selected by the network. The UE provides the network in the registration message with an IE including 3 bit encoding scheme as shown in table 1:

TABLE 1

| Coding scheme indicator (octet 3, n + 1, bits 6 to 8) | | | |
|---|---|---|---|
| 7 | 6 | 5 | |
| 0 | 0 | 0 | Cell Broadcast data coding scheme, GSM default alphabet, language unspecified, defined in 3GPP TS 23.038 [3] |
| 0 | 0 | 1 | UCS2 (16 bit), defined in ISO/IEC 10646 [29] |

All other values are reserved.
Text string
Contains textual description of the emergency service encoded according to the coding scheme indicated by the coding scheme field.

The UE provides the network in the registration message with an IE indicating the number of languages length field, in octets. For example, if ISO 639-1 is used and two languages are indicated, e.g., EN and FR, then "Octets used to encode languages" is set to indicate "4 octets" as shown in table 2:

TABLE 2

| Octets used to encode languages indicator (octet 3, n + 1, bits 4 to 2) | | | |
|---|---|---|---|
| 4 | 3 | 2 | |
| 0 | 0 | 0 | 1 octet |
| 0 | 0 | 1 | 2 octets |
| 0 | 1 | 0 | 3 octet2 |
| 0 | 1 | 1 | 4 octets |
| 1 | 0 | 0 | 5 octet2 |
| 1 | 0 | 1 | 6 octets |
| 1 | 1 | 0 | 7 octet2 |
| 1 | 1 | 1 | 8 octets |

The UE provides the network in the registration message with an IE identifying a standard used to encode the language, e.g., ISO 639-1 as shown in table 3:

TABLE 3

| Language standard used indicator (octet 3, n + 1, bits 2 to 1) | | |
|---|---|---|
| 7 | 6 | |
| 0 | 0 | ISO 639-1 |
| 0 | 1 | ISO 639-2 |

All other values are reserved.

Table 4 depicts a UE language setting information element. Octet 3 of the IE and octet n+1 of the IE make reference to the previously introduced Language standard used, Octets used to encode languages, and Coding scheme:

TABLE 4

| 8 | 7 | 6 | 5 | 4 | 3 | 2 | 1 | |
|---|---|---|---|---|---|---|---|---|
| | | UE language setting IEI | | | | | | octet 1 |
| | | Length of UE language setting | | | | | | octet 2 |
| Coding scheme | | Octets used to encode languages | | | Language standard used | | | octet 3 |
| | | | | | | | | octet 4 |
| | | | | | | | | octet n* |
| Coding scheme | | Octets used to encode languages | | | Language standard used | | | octet n + 1* |
| | | | | | | | | octet n + 2* |
| | | ... | | | | | | octet m* |

The "Support for description of emergency identifiers" indicator indicates whether the UE can use the description of emergency identifiers. This is an indicator part of "indicator A" and is shown in table 5:

TABLE 5

| Support for description of emergency identifiers indicator (octet 2) |
|---|
| 8 |
| 1    Support description of emergency identifiers |
| 0    Do not transmit description of emergency identifiers |

In an alternate embodiment, the "Support for description of emergency identifiers" indicator could be encoded in an information element (IE) listing UE capabilities or an IE listing capabilities during mobility management.

The "Support for description of emergency identifiers" is named "support" the IE with the "Support for description of emergency identifiers IEI". The field indicates the number of descriptions of emergency identifiers supported. It should be set to 0 if "Support for description of emergency identifiers" is set to 0. If "Support for description of emergency identifiers IEI" is absent from the registration message, the network assumes the UE does not have support for handling the description of emergency identifiers. If there is no support for handling the description of emergency identifiers, the network should not include the description of emergency identifiers in the registration response or registration accept message. This is shown in table 6:

TABLE 6

| 8 | 7 | 6 | 5 | 4 | 3 | 2 | 1 | |
|---|---|---|---|---|---|---|---|---|
| Support for description of emergency identifiers IEI | | | | | | | | octet 1 |
| Support | Number of descriptions of emergency identifiers supported | | | | | | | octet 2 |

The "Stored (description of) emergency indicators IEI" is part of indicator C and shown in table 7. The "Identifier identifying stored (description of) emergency identifiers" is an 8 bit identifier that is either allocated by the network or calculated by the UE. If calculated by the UE, bit 8 of "Identifier identifying stored (description of) emergency identifiers" field indicates whether or not the UE supports description of emergency identifiers. Bit 8 is set as "Support for description of emergency identifiers indicator" in section 6.1.3.2. If bit 8 is set to 1, the UE derives the 7 bit Identifier identifying stored (description of) emergency identifiers from the emergency identifiers and the description of emergency identifiers. If bit 8 is not set to 1, the UE derives the 7 bit Identifier identifying stored (description of) emergency identifiers from the emergency identifiers only. If allocated by the network, the UE receives the value for "Identifier identifying stored (description of) emergency identifiers" in the "Identifier identifying (description of) emergency identifiers."

TABLE 7

| 8 | 7 | 6 | 5 | 4 | 3 | 2 | 1 | |
|---|---|---|---|---|---|---|---|---|
| Stored (description of) emergency identifiers IEI | | | | | | | | octet 1 |
| Identifier identifying stored (description of) emergency identifiers | | | | | | | | octet 2 |

The network will compare the "Identifier identifying stored (description of) emergency identifiers" received in a registration message with a stored "Identifier identifying stored (description of) emergency identifiers". If the identifiers match, no (description of) emergency identifiers are transmitted to the UE. If the identifiers do not match, (description of) emergency identifiers are transmitted to the UE.

The Extended Emergency Number List is enhanced to support inclusion of one or more emergency identifier descriptions as shown in table 8. In the table, "Length of nth emergency identifier descriptions" describes the total octets used for describing one or more emergency identifier descriptions. Field "Number of octets used by language identifier" lists the number of octets used by the language identifier, e.g., 2 when set in accordance with ISO 639-1. Field "Language identifier" includes the language identifier of the language used when populating the field "Length nth emergency identifier description". Field "length of 1st nth emergency identifier description" is the length of the $1^{st}$ of "nth emergency identifier description" in octets. Other fields are described herein. Not all the fields depicted below need to be present in the IE. For example, when the IE only supports encoding of one emergency identifier description per emergency identifier, some fields described in this IE are not needed. For example, ""length of 1st nth emergency identifier description"" field would not be needed and "$1^{st}$ of "nth emergency identifier description" could be renamed into "nth emergency identifier description" in the table.

TABLE 8

| 8 | 7 | 6 | 5 | 4 | 3 | 2 | 1 |
|---|---|---|---|---|---|---|---|
| Extended Emergency Number List IE | | | | | | | |
| ... | | | | | | | |
| Identifier identifying (description of) emergency identifiers | | | | | | | |
| ... | | | | | | | |
| Number digit 2 | | | | Number digit 1 | | | |
| Number digit 4 | | | | Number digit 3 | | | |
| . | | | | . | | | |
| . | | | | . | | | |
| Length of nth sub-services field | | | | | | | |
| sub-services field | | | | | | | |
| Length of nth emergency identifier descriptions | | | | | | | |
| Coding scheme | | Number of octets used by language identifier | | | Language standard used | | |
| Language identifier | | | | | | | |
| Length $1^{st}$ of nth emergency identifier description | | | | | | | |
| $1^{st}$ of nth emergency identifier description | | | | | | | |
| Coding scheme | | Number of octets used by language identifier | | | Language standard used | | |

TABLE 8-continued

| 8 | 7 | 6 | 5 | 4 | 3 | 2 | 1 |
|---|---|---|---|---|---|---|---|
| | | | Language identifier $2^{nd}$ of nth emergency identifier description | | | | |
| | | | . . . | | | | |

The following indicators may be derived by the UE to the network.

Screen indicator—an AT command could be used to set this indication. The AT command indicates to the xxx at there is no screen. Alternatively the ME via an internal mechanism can determine if a screen is supported or not.

The language supported indicator could be determined by: 1) within the ME is stored a list of Mobile Country codes and against each country code zero to many languages, the ME reads the IMS from the UICC and determines by comparing the MCC of the IMSI against that stored in memory, it then sets the indication according to the language; 2) the MMI has an ability to set a language, this is stored in memory in the ME, the ME uses this setting to set the indication; or 3) the ME uses the $EF_{LI}$ (Language Indication) as defined in 3GPP TS 31.102 to set the language indication, the ME takes the contents of the $EF_{LI}$ (Language Indication) as defined in 3GPP TS 31.102 and puts it into the new information element illustrated in table 4.

The "ability to store N description of emergency identifier" may be determined by: 1) the ME reads the USIM and or ISIM service table to determine if a file is supported, the file, if present, will have the characteristics to store "description of emergency identifiers", if the USIM and or ISIM does not contain an indication that the file is supported this indicates that the USIM and or ISIM cannot store descriptions of emergency identifier; 2) the ME determines via an internal mechanism if there is memory to store descriptions of emergency identifier; or 3) the ME receives an AT command that indicates that it can store descriptions of emergency identifier and optionally the number of descriptions of emergency identifier that can be stored.

The UE may delete the language descriptors on power cycle. Thus it is more efficient that if the UE is still on the same VPLMN or even in the same country (determined by MCC) that the network does not send the same information. If the UE has power cycled it shall send an indication.

If the ME has previously stored the description of emergency identifiers then the ME shall perform the following: 1) compare the RPLMN Mobile Country Code and optionally Mobile Network Code to that is stored in memory, this could be achieved by either reading the new UICC files as described herein or having the data described in stored in the ME memory; 2) if the MCC is a match (MCC of the RPLMN matches the PLMN of the stored descriptions of emergency identifier optionally also that the MNC of the RPLMN match that of the PLMN of the stored descriptions of emergency identifier) then the ME can indicate that it has previously stored description of emergency identifiers; and 3) if the MCC is not a match then the ME provides no indication, this is either by not including an information element or provided an indication of non-storage.

An AT command could be used to set this indication. The AT command indicates that there is no support to receive description of emergency identifiers. Alternatively the ME via an internal mechanism can determine receipt of emergency identifiers is supported. The ME may also read this functionality from the UICC.

The input from the UE to determine what language to use may be any of the following: 1) an indication from the UE of the languages it supports; 2) private identity of the received from the UE; or 3) power cycle indication. If the network node receives both, then the indication of the language the UE supports could take precedence. Reason being is that the user of the device could be a prepaid user and their native language is different to that from the HPLMN. If the network node receives an indication that the UE does not support a display or man machine interface, or the UE does not support language descriptors then the Network node does not send the language descriptor to the UE.

The UE may have provided zero to many indications of the language that is supported. The network node will then use this information to determine if there is an appropriate language descriptor stored or can be retrieved from an external database for each emergency URN that will be sent to the UE. An example might be the UE sends 3 language support indications that transpose to: English, French, German. Within the Network node is a database of the local emergency URNs, for each URN there could be multiple language descriptors to send, an example is shown in Table 9:

TABLE 9

| Emergency Identifier | | |
|---|---|---|
| URN | Equivalent digit | descriptions of emergency identifiers |
| Sos.dog. catcher | 145 | Language 1 e.g. Dog catcher Language 2 e.g. Attrape-chien (French) Language 3 e.g. Hundefänger (German) |
| Sos.poison. control | 167 | Language 1 Language 2 |

The Language descriptor would be returned to the UE, e.g., in what is labeled as 9.9.3.37A. The $1^{st}$ Emergency number would BCD encode 145. The "$1^{st}$ of nth emergency identifier description" would contain "Dog catcher", the "$2^{nd}$ of nth emergency identifier description" would contain "Attrape-chien." (excuse our French) If the UE sent no language descriptor, then the Network Node may be configured with a default language to send to the UE. The default setting may be on a per Mobile Country Code (MCC), Mobile Network Code (MNC) basis.

The Network node receives a private identity from the UE. It could be an IMSI, SUCI, or a IMS Private Identity. In these situations the Network node can determine the Mobile Country Code. The MCC can identify a language or group of languages, e.g., Switzerland has 3 (German, French, Italian). Using the MCC the Network node determines the languages and performs the same as described above with table 9.

If the network node already has an identity of the UE stored, e.g., IMSI, etc., and optionally if the network has an indication that it has previously sent the language descriptors to the UE over 3GPP or non 3GPP access, then the network node may determine not to send the language descriptors. The determination may be based upon receipt of the Power cycle indication from the UE. If the UE has power cycled then the network may send the language descriptors, if the UE has not power cycled then the descriptors may not be sent.

If the UE indicates by an indicator (e.g., information element) it supports a display or MMI then functionality in the sections above may be performed. If the UE indicates by an indicator (e.g., information element) it does not support a display or does not support an MMI then the Network Node will not send description of emergency identifiers. If the UE provides no indicator (lack of information element) then the network node either uses default behavior (described earlier) or the network node does not include the description of emergency identifiers.

When the ME receives the description of emergency identifiers and associated emergency identifiers it shall store them in memory. This may be ME memory, secure memory module, or UICC application. The storage relationship may be similar to table 9. When stored in the UICC, the ME sends the description of emergency identifiers and emergency identifier in a message to the UICC. Optionally, it may receive back a message from a UICC. An example of how the text can be stored on the USIM application is contained in FIGS. 8A-8E which depict an embodiment of proposed changes to 3GPP TS 31.102. Similar data structure could be used to store the data elsewhere.

The various methods or operations described herein may be implemented in a 3GPP 4G network and any equivalent components in a 3GPP 5G network. Further, the embodiments described herein may be combined in whole or in part.

Figure 9:
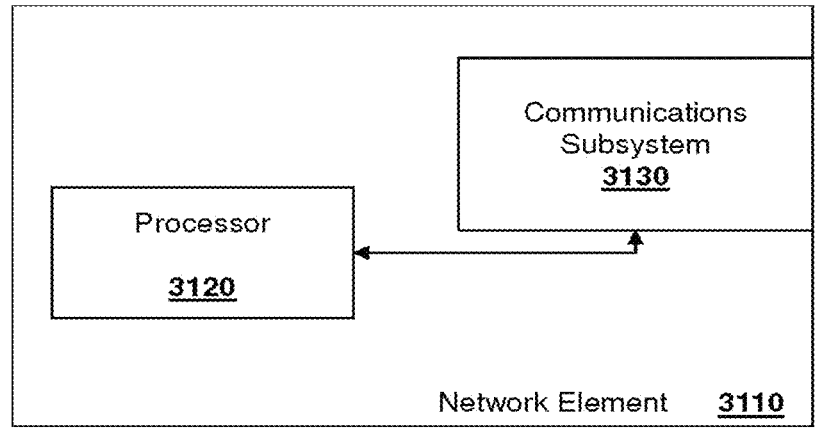
FIG. 9 is a diagram of and embodiment of a network element.

The various methods or operations described herein may be implemented by a network element. An example network element is shown with regard to FIG. 9. In FIG. 9, network element 3110 includes a processor 3120 and a communications subsystem 3130, where the processor 3120 and communications subsystem 3130 cooperate to perform the methods or operations previously described.

Figure 10:
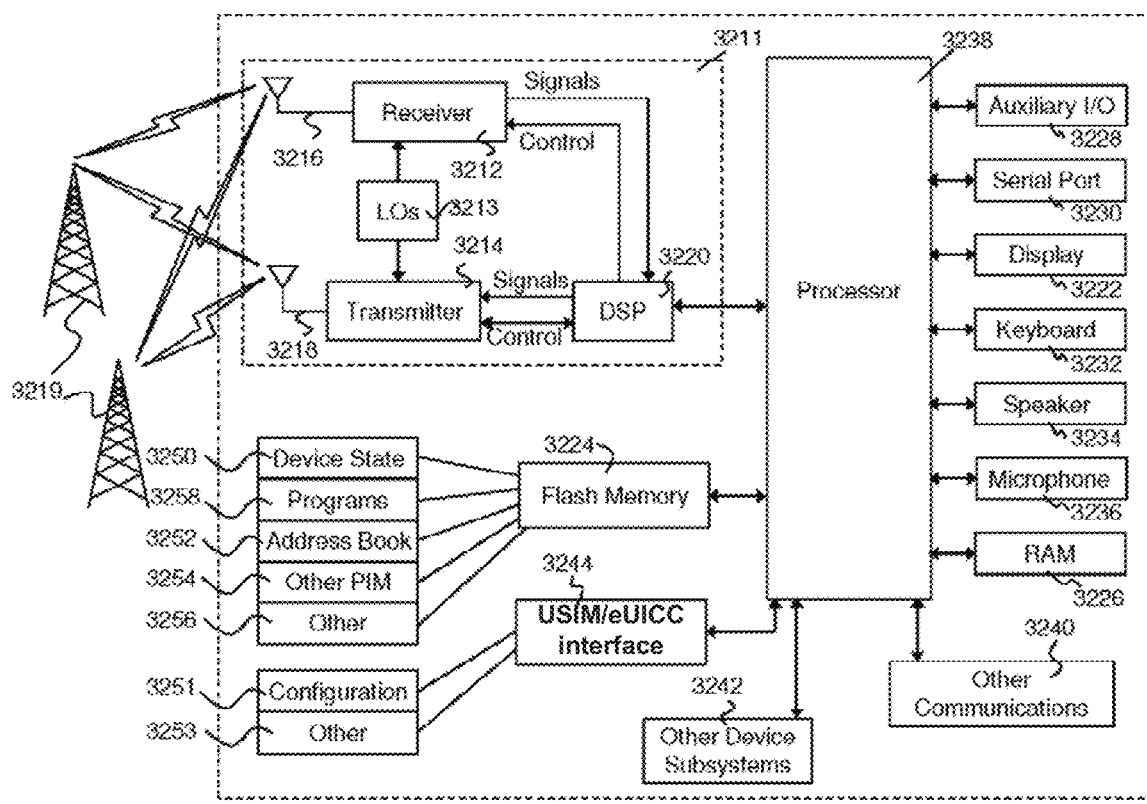
FIG. 10 is a diagram of an embodiment of a communications device.

Further, the various methods or operations described herein may be implemented by a communications device (e.g., UEs, network nodes, TE, etc.). An example of a communications device is described below with regard to FIG. 10. The communications device 3200 may comprise a two-way wireless communication device having voice and data communication capabilities. In some embodiments, voice communication capabilities are optional. The communications device 3200 may have the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of network 3219. In some networks, network access is associated with a subscriber or user of the communications device 3200. The communications device 3200 may use a USIM or eUICC in order to operate on a network. The USIM/eUICC interface 3244 is typically similar to a card slot into which a USIM/eUICC card may be inserted. The USIM/eUICC card may have memory and may hold many key configurations 3251 and other information 3253, such as identification and subscriber-related information.

When network registration or activation procedures have been completed, the communications device 3200 may send and receive communication signals over the network 3219. As illustrated, the network 3219 may comprise multiple base stations communicating with the communications device 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, one or more other communication subsystems 3240 such as a short-range communications subsystem, and any other device subsystems generally designated as 3242. While the other communication subsystems 3240 and device subsystems 3242 are depicted as separate components in FIG. 10, it is to be understood that subsystems 3240 and device subsystems 3242 (or parts thereof) may be integrated as a single component. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

Software applications may be loaded onto the communications device 3200 through the network 3219, an auxiliary I/O subsystem 3228, serial port 3230, short-range communications subsystem(s) 3240, or any other suitable subsystem(s) 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

For voice communications, overall operation of the communications device 3200 is similar, except that received signals may typically be output to a speaker 3234 and signals for transmission may be generated by a microphone 3236. Alternative voice or audio I/O subsystems, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the communications device 3200 by providing for information or software downloads to the communications device 3200 other than through a wireless communication network 3219. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, one or more other subsystems 3240 may include an infrared device and associated circuits and components or a Bluetooth™ communication module to provide for communication with similarly enabled systems and devices. Subsystems 3240 may further include non-cellular communications such as WI-FI, WiMAX, near field communication (NFC), BLUETOOTH, ProSe (Proximity Services) (e.g., sidelink, PC5, D2D, etc.), and/or radio frequency identification (RFID). The other communications subsystem(s) 3240 and/or device subsystem(s) 3242 may also be used to communicate with auxiliary devices such as tablet displays, keyboards or projectors.

Figure 11:
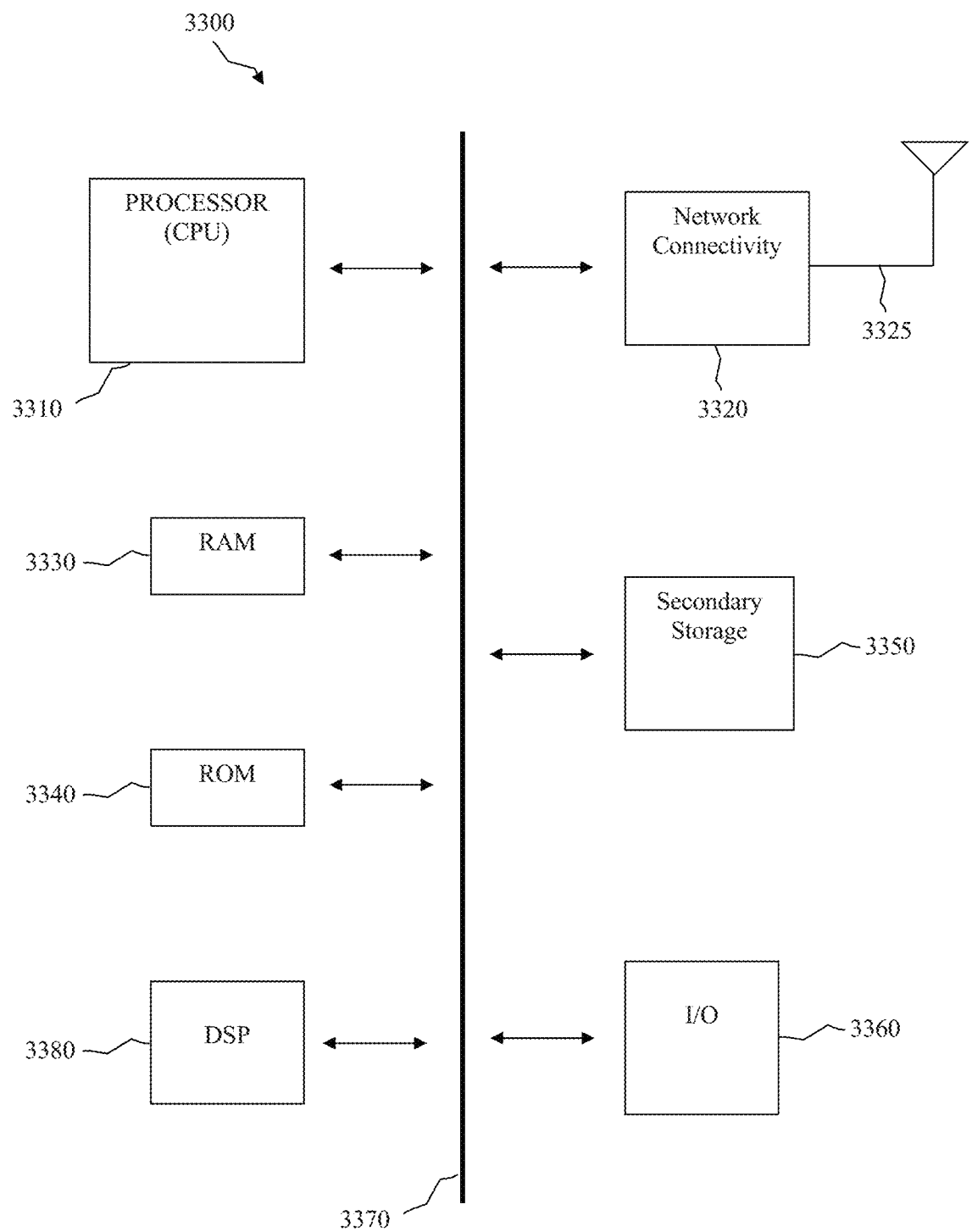
FIG. 11 is a diagram of an embodiment of a system suitable for implementing the embodiments described herein.

The communications device 3200 and other components described above might include a processing component that is capable of executing instructions related to the actions described above. FIG. 11 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, wireless local area network (WLAN) devices, radio transceiver devices such as code division multiple access (CDMA) devices, GSM radio transceiver devices, universal mobile telecommunications system (UMTS) radio transceiver devices, LTE radio transceiver devices, new generation radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: ISO639-1, ISO639-2, 3GPP TS23.167, 3GPP TS23.501, 3GPP TS27.007, 3GPP TS23.003, 3GPP TS24.002, 3GPP TS24.008, 3GPP TS22.101, 3GPP TS31.102, and 3GPP TS23.038.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving, by a network node from a user equipment (UE), a registration request comprising a first indicator configured to indicate emergency call information display capability, wherein the first indicator indicates whether a mobile equipment (ME) domain of the UE is configured to send descriptions of emergency identifiers to a display of the UE, and wherein the registration request further comprises a mobile country code (MCC);
   determining, by the network node, whether the descriptions of emergency identifiers need to be included in a registration accept message;
   in response to determining that the descriptions of emergency identifiers need to be included in a registration accept message, selecting, by the network node, a language to use for transmitting the description of emergency identifiers based on the MCC; and
   transmitting, from the network node to the UE, the registration accept message comprising the descriptions of emergency identifiers, wherein the descriptions of emergency identifiers are in the determined language,
   wherein the registration further comprises a third indicator configured to indicate a status of previously received emergency information, and wherein the status of previously received emergency information comprises one or more of:
   the UE has previously stored previously received descriptions of emergency identifiers,
   an indication of the previously received descriptions of emergency identifiers,
   an indication of previously received emergency identifiers, or
   an indication of no previously stored descriptions of emergency identifiers.

2. The method of claim 1, wherein the emergency call information display capability further comprises one or more of:
   the UE is configured to display an emergency call service type;
   the UE comprises a display;
   the UE is configured to store the descriptions of emergency identifiers; or
   a quantity of the descriptions of emergency identifiers the UE is configured to store.

3. The method of claim 1, wherein the registration further comprises a second indicator configured to indicate language information, and wherein the language information comprises one or more of:
   languages or encoding supported by the UE;
   languages or encodings preferred by the UE; or
   languages or encodings supported by an end user of the UE.

4. The method of claim 1, further comprising:
   determining, by the network node, a list of descriptions of emergency identifiers based on the registration request; and
   transmitting, by the network node to the UE, the list of descriptions of emergency identifiers when the third indicator comprises the indication of no previously stored descriptions of emergency identifiers.

5. A network node comprising:
   a memory; and
   a processor, wherein the processor is configured to:
   receive, from a user equipment (UE), a registration request comprising a first indicator configured to indicate emergency call information display capability, wherein the first indicator indicates whether a mobile equipment (ME) domain of the UE is configured to send descriptions of emergency identifiers to a display of the UE, and wherein the registration request further comprises a mobile country code (MCC);
   determine whether the descriptions of emergency identifiers need to be included in a registration accept message;
   in response to determining that the descriptions of emergency identifiers need to be included in a registration accept message, selecting a language to use for transmitting the description of emergency identifiers based on the MCC; and
   transmit, to the UE, the registration accept message comprising the descriptions of emergency identifiers, wherein the descriptions of emergency identifiers are in the determined language, wherein the registration further comprises a third indicator configured to indicate a status of previously received emergency information, and wherein the status of previously received emergency information comprises one or more of:
- the UE has previously stored previously received descriptions of emergency identifiers,
- an indication of the previously received descriptions of emergency identifiers,
- an indication of previously received emergency identifiers, or
- an indication of no previously stored descriptions of emergency identifiers.

6. The network node of claim 5, wherein the emergency call information display capability further comprises one or more of:
- the UE is configured to display an emergency call service type;
- the UE comprises a display;
- the UE is configured to store the descriptions of emergency identifiers; or
- a quantity of the descriptions of emergency identifiers the UE is configured to store.

7. The network node of claim 5, wherein the registration further comprises a second indicator configured to indicate language information, and wherein the language information comprises one or more of:
- languages or encoding supported by the UE;
- languages or encodings preferred by the UE; or
- languages or encodings supported by an end user of the UE.

8. The network node of claim 5, wherein the processor is further configured to:
- determine a list of descriptions of emergency identifiers based on the registration request; and
- transmit, to the UE, the list of descriptions of emergency identifiers when the third indicator comprises the indication of no previously stored descriptions of emergency identifiers.

9. A non-transitory computer readable medium containing instructions that when executed by a processor cause the processor to:
- receive, from a user equipment (UE), a registration request comprising a first indicator configured to indicate emergency call information display capability, wherein the first indicator indicates whether a mobile equipment (ME) domain of the UE is configured to send descriptions of emergency identifiers to a display of the UE, and wherein the registration request further comprises a mobile country code (MCC);
- determine whether the descriptions of emergency identifiers need to be included in a registration accept message;
- in response to determining that the descriptions of emergency identifiers need to be included in a registration accept message, selecting a language to use for transmitting the description of emergency identifiers based on the MCC; and
- transmit, to the UE, the registration accept message comprising the descriptions of emergency identifiers, wherein the descriptions of emergency identifiers are in the determined language,
- wherein the registration further comprises a third indicator configured to indicate a status of previously received emergency information, and wherein the status of previously received emergency information comprises one or more of:
- the UE has previously stored previously received descriptions of emergency identifiers;
- an indication of the previously received descriptions of emergency identifiers;
- an indication of previously received emergency identifiers; or
- an indication of no previously stored descriptions of emergency identifiers.

10. The non-transitory computer readable medium of claim 9, wherein the emergency call information display capability further comprises one or more of:
- the UE is configured to display an emergency call service type;
- the UE comprises a display;
- the UE is configured to store the descriptions of emergency identifiers; or
- a quantity of the descriptions of emergency identifiers the UE is configured to store.

11. The non-transitory computer readable medium of claim 9, wherein the registration further comprises a second indicator configured to indicate language information, and wherein the language information comprises one or more of:
- languages or encoding supported by the UE;
- languages or encodings preferred by the UE; or
- languages or encodings supported by an end user of the UE.

12. The non-transitory computer readable medium of claim 9, wherein the instructions when executed by the processor further configure the processor to:
- determine a list of descriptions of emergency identifiers based on the registration request; and
- transmit, to the UE, the list of descriptions of emergency identifiers when the third indicator comprises the indication of no previously stored descriptions of emergency identifiers.

* * * * *